United States Patent
Farrell et al.

(10) Patent No.: US 6,249,855 B1
(45) Date of Patent: *Jun. 19, 2001

(54) ARBITER SYSTEM FOR CENTRAL PROCESSING UNIT HAVING DUAL DOMINOED ENCODERS FOR FOUR INSTRUCTION ISSUE PER MACHINE CYCLE

(75) Inventors: James A. Farrell, Harvard, MA (US); Bruce A. Gieseke, San Jose, CA (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,474

(22) Filed: Jun. 2, 1998

(51) Int. Cl.[7] .................................................. G06F 9/38
(52) U.S. Cl. .............................. 712/23; 712/28; 712/212; 712/214; 712/217; 712/218
(58) Field of Search .................................. 712/23, 2, 3, 4, 712/9, 28, 212, 214, 217, 218, 235

(56) References Cited

U.S. PATENT DOCUMENTS

| | | | |
|---|---|---|---|
| 5,067,089 | * 11/1991 | Fite et al. ................................ | 712/218 |
| 5,197,137 | * 3/1993 | Kumar et al. ........................... | 709/107 |
| 5,699,536 | * 12/1997 | Hopkins et al. ........................ | 712/216 |
| 5,796,973 | * 8/1998 | Witt et al. .............................. | 712/208 |

OTHER PUBLICATIONS

Gieseke, Bruce A. et al., "A 600MHz Superscalar RISC Microprocessor With Out–Of–Order Execution", Paper presented at meeting dated Feb. 7, 1997.

Keller, Jim, "The 21264: A superscalar Alpha Processor with Out–of–Order Execution", Paper presented at the Microprocessor Forum on Oct. 22–23, 1996.

Gwennap, Linley, "Digital 21264 Sets New Standard", *Microprocessor Report*, vol. 10, Issue 14, (Oct. 28, 1996).

\* cited by examiner

*Primary Examiner*—Daniel H. Pan
*Assistant Examiner*—Dzung C. Nguyen
(74) *Attorney, Agent, or Firm*—Hamilton, Brook, Smith & Reynolds, P.C.

(57) ABSTRACT

An arbiter system for the instruction issue logic of a CPU has at least two encoder circuits that select instructions in an instruction queue for issue to first and second execution units, respectively, based upon the positions of the instructions within the queue and requests by the instructions for the first and/or second execution units. As a result, since the instruction can request different execution units, this system is compatible with architectures where the execution units may have different capabilities to execute different instructions, i.e., each integer execution unit may not be able to execute all of the instructions in the CPU's integer instruction set. According to the present invention, one of the encoder circuits is subordinate to the other circuit. The subordinate encoder circuit selects instructions from the instruction queue based not only on the positions of the instructions and their requests, but the instruction selection of the dominant encoder circuit.

48 Claims, 7 Drawing Sheets

ARBITER SYSTEM FOR CENTRAL PROCESSING UNIT HAVING DUAL DOMINOED ENCODERS FOR FOUR INSTRUCTION ISSUE PER MACHINE CYCLE

BACKGROUND OF THE INVENTION

A central processing unit (CPU) that executes instructions out-of-order utilizes issue logic to clear instructions for passage to the CPU's execution unit(s). This issue logic can be divided into a number of discrete components that perform aspects of the issue clearance. An instruction scoreboard is used by the issue logic to weigh the register resource requirements of each instruction in an instruction queue to ultimately prioritize the instructions for issuance. Instructions waiting in the instruction queue are represented as flat bit vectors in the scoreboard logic. Each bit represents a register of the CPU and is set, or not, based on whether the associated instruction utilizes the register. Request logic identifies which instructions in the instruction queue are ready to issue to the execution units. Finally, an arbiter actually selects the instructions for issue based upon information derived by the scoreboard and request logic.

In older CPU architectures, the arbiter circuit merely had to select one instruction for issue per cycle. In these CPUs, there was typically one integer and one floating point execution unit, with separate instruction queues.

More modern CPUs utilize multiple, parallel execution units to maximize the number of instructions that can issue per machine cycle. These architectures complicate somewhat the design of the arbiter. Not only must it be possible to execute the two instructions simultaneously based upon the register requirements, for example, but if two arbiters are used to select the two instructions for issue, the two arbiters must coordinate their mutual operation to ensure that the same instruction is not sent to different execution units. This of course wastes compute resources since the multiple execution units will be duplicating each others work.

One solution to this problem is to a priori assign each instruction in the instruction queue to issue to one or the other of the execution units. One of the arbiters is then assigned to select from the instructions to issue to one execution unit, and the other arbiter is assigned to select instructions to issue in the other execution unit.

SUMMARY OF THE INVENTION

The problem with the conventional approach to coordinating the operation of the arbiters is that it sub-optimally utilizes the CPU's compute resources. The instructions are assigned to one or the other of the execution units without any assessment as to the state of the execution units when the instructions are ready to issue. As a result, due to prior instructions being executed by one of the execution units, it may occur that the execution unit to which a particular instruction has been assigned is not ready to execute that instruction due to a long latency event such as waiting for bus access, for example. Thus, the instruction cannot issue, even though it may be the lowest instruction in the instruction queue.

The present invention is directed to an arbiter system for the instruction issue logic of a CPU having two or more execution units operating in parallel. The arbiter system comprises two encoder circuits that select instructions in an instruction queue for issue to first and second execution units, respectively, based upon the positions of the instructions within the queue and requests by the instructions for the first and/or second execution units. As a result, since the instruction can request different execution units, this system is compatible with situations where the execution units may have different capabilities to execute different instructions, i.e., each execution unit may not be able to execute all of the instructions in the CPU's instruction set. According to the present invention, one of the encoder circuits is subordinate to the other circuit. The subordinate encoder circuit selects instructions from the instruction queue based not only on the positions of the instructions and their requests, but also on the instruction selection of the dominant encoder circuit. As a result, the encoder circuits coordinate their respective operations, allowing the highest-priority queued instruction to be executed in either of at least two execution units, avoiding the need for execution unit assignments at this level.

In specific embodiments, the dominant and subordinate encoder circuits select at least two instructions for issue within one machine cycle, for issue in the next machine cycle. As a result, the circuitry of the encoder circuits must be fast enough to allow for this operation. This is accomplished by having each encoder circuit receive a request signal indicating whether each instruction unit in the instruction queue can issue to the execution unit for which the encoder circuits select instructions. The dominant encoder circuit then generates a first execution unit grant signal for the oldest queued or highest priority instruction that requests the first execution unit. Accordingly, the first or dominant encoder circuit operates as a greedy picking circuit. The subordinate encoder circuit then generates a grant signal to the highest priority instruction that requests the second execution unit and for which the dominant encoder has not generated a grant signal.

In the implementation of the preferred embodiment, the dominant encoder forms the grant signal by pre-charging a grant line for each row if the instruction of the row requests the first execution unit. The grant lines are then de-asserted for all higher-queued or lower priority instructions with respect to the lowest row for which a request signal is generated for the first execution unit. The subordinate encoder circuit then generates a grant signal also by pre-charging the grant lines for each row if the instruction for the row requests the second execution unit and then de-asserts the grant lines of all higher-queued or lower priority instructions for the lowest row for which a request signal is generated and the dominant encoder circuit did not generate a grant signal for the instruction of that row.

An array of state elements is used at the output of the grant lines for both encoder circuits. A state element for each row only generates an issue signal to the second execution unit in response to an asserted grant line for the row from the subordinate encoder and the de-asserting of the grant line for the dominant encoder. As a result, the state elements essentially use the grant line de-assertion from the dominant encoder circuit as a clock edge to set the output of the grant line from the subordinate encoder circuits, with the pre-charge clock being used to latch any grant signal from the subordinate encoder. In this way, the subordinate encoder circuit operates in response to the output of the dominant encoder circuit even though no clock edge is available because the dominoing of the two encoder circuits happens within a single machine cycle.

In specific embodiments, multiple pairs of dominant/subordinate encoders may be used to select additional instructions for issue to additional execution units. Particularly, in the preferred embodiment, two pairs of encoder circuits are used to select instructions for four execution units. Specifically, a second dominant encoder circuit is used to select instructions for the third execution unit and a second subordinate encoder circuit is used to select instructions for a fourth execution unit. Instructions, upon entering the instruction queue, are assigned to either pair of the instruction units.

In general, according to another aspect, the invention also features a prioritizing latching circuit for dynamic logic, which operates within a single clock period. Specifically, in response to grant lines from a dominant encoder and a subordinate encoder, which are not commonly asserted, the prioritizing latching circuit is set in response to a de-assertion of a grant line from the dominant encoder circuit to pass any grant signal from the subordinate encoder circuit.

In general, according to still another aspect, the invention also features a method for assigning instructions between execution units of a central processing unit: This method comprises selecting instructions in an instruction queue for issue to a first execution unit based upon positions of the instructions within the queue and requests by the instructions for the first execution unit. Instructions in the instruction queue are then selected for issue to the second execution unit based upon the positions of the instructions within the queue, requests by the instructions for the second execution unit, and an instruction selected by the first execution unit to ensure that the same instruction is not sent to both execution units.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF THE INVENTION

Figure 1:
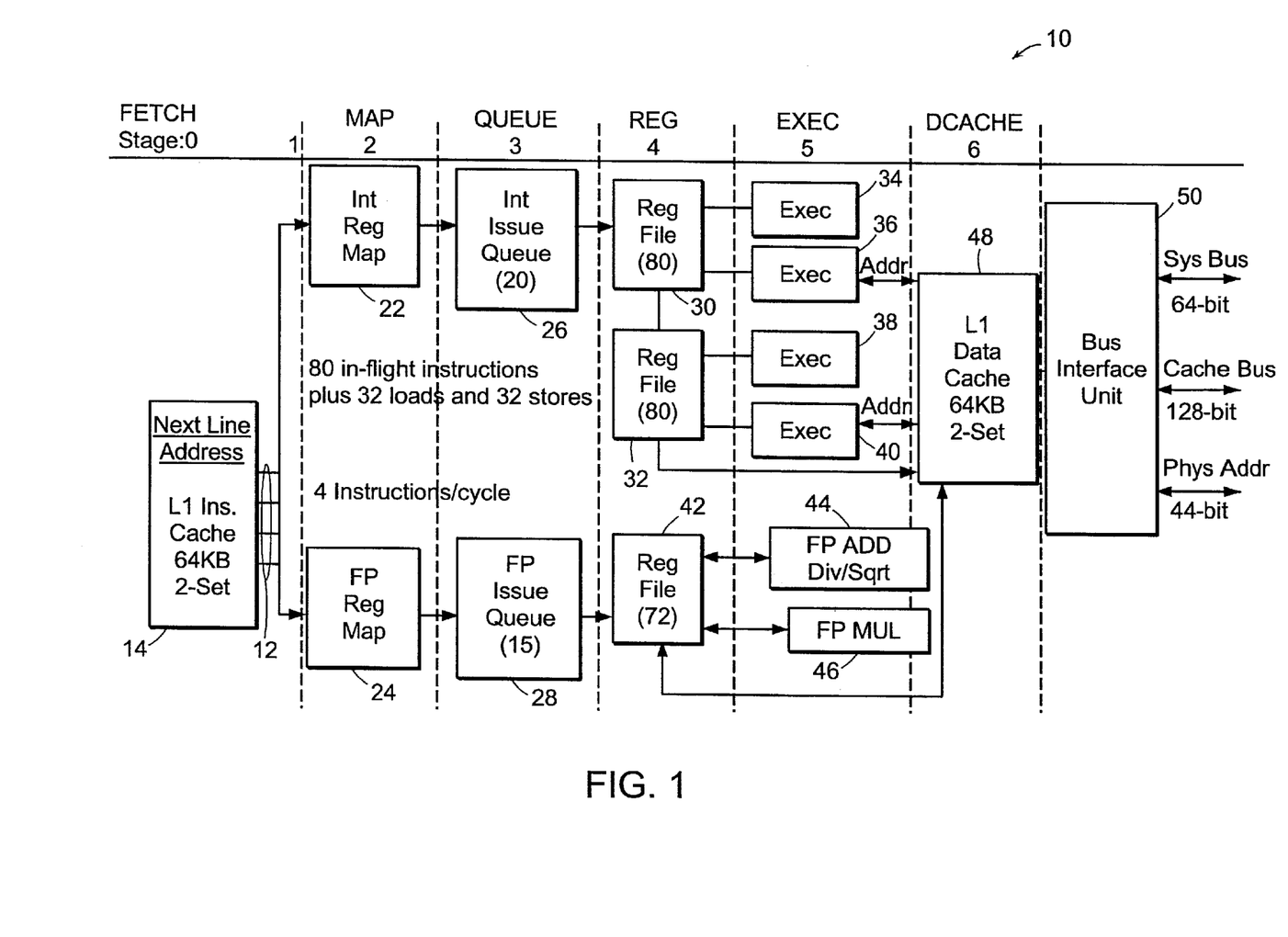
FIG. 1 is a block diagram illustrating the pipeline stages of a CPU to which the present invention is applied.

FIG. 1 is a block diagram illustrating the pipeline stages of a CPU 10 in which the present invention is implemented. Specifically, during fetch stages 0 and 1, four instructions 12 are fetched per machine cycle from the instruction cache 14.

Mapping pipeline stage 2 assigns the virtual registers identified in the fetched instruction to physical registers maintained in the CPU 10. In the preferred embodiment, four instructions are renamed per cycle, assigning up to 8 source and 4 destination registers. Further, there are 80 physical integer registers and 72 physical floating point registers. These mappings are performed in separate integer register mapper 22 and floating point register mapper 24.

Queue pipeline stage 3, containing the inventive arbiter system, issues instructions out-of-order when data and execution units are ready, i.e., when the registers containing the data are available. In the preferred embodiment, instructions leave the queues after they issue. There are 20 instruction entries in the integer issue queue 26 and 15 instruction entries in the floating point issue queue 28. Up to four integer instructions issue per cycle, and up to two floating point instructions issue per cycle.

In register pipeline stage 4, dual integer register files 30, 32 pass the data required by the issued instructions to four integer execution units 34–40. In a similar fashion, floating point register file 42 passes the required data for the floating point instructions to floating point divide/squareroot unit 44 and floating point multiply unit 46.

Two of the integer execution units 36, 40 have the capability to issue addresses to data cache 48, enabling two load/stores per cycle. The data cache 48 communicates off-chip via the bus interface 50.

Figure 2:
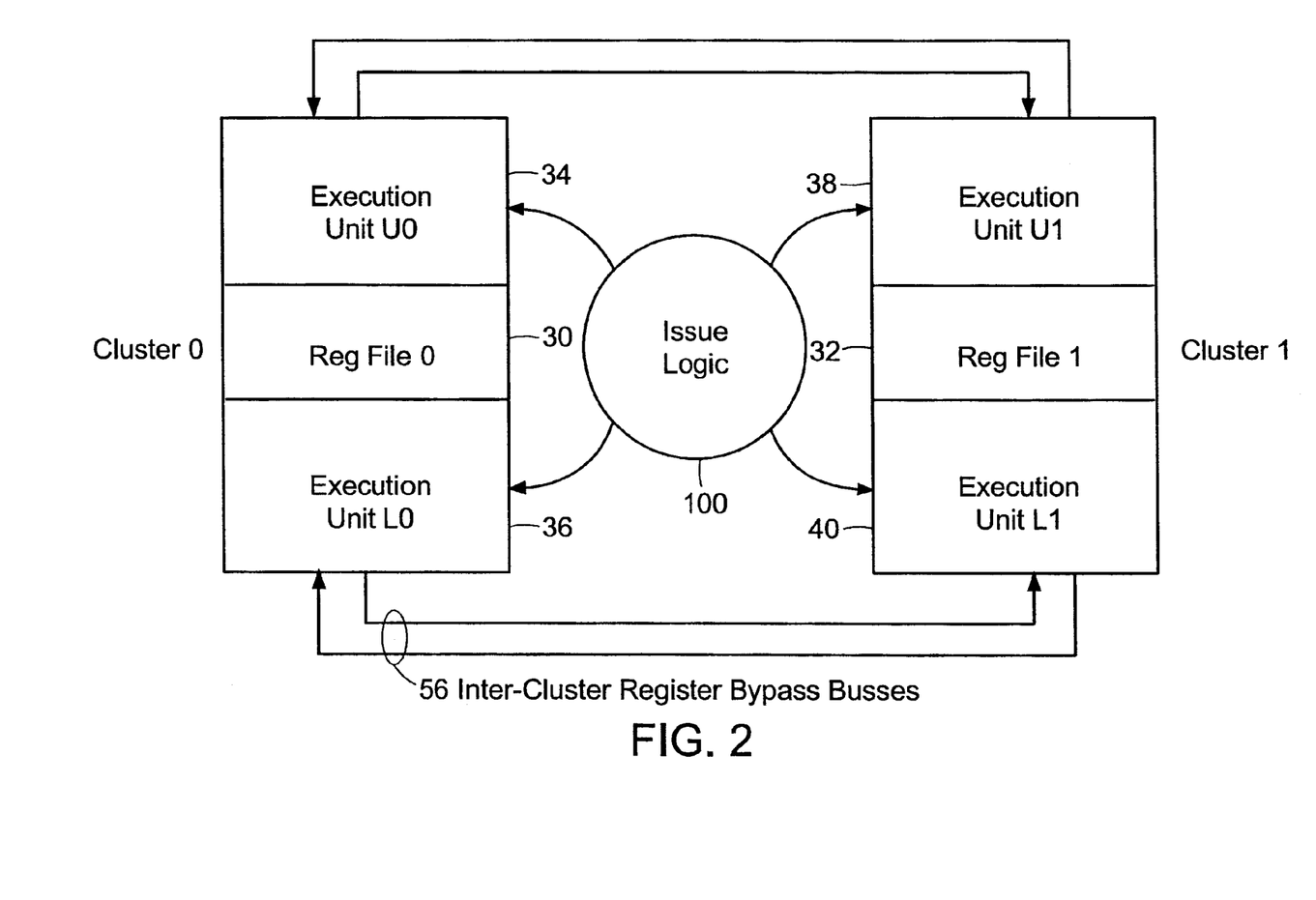
FIG. 2 is a block diagram showing the relationship between the issue logic, register files, and execution units of the CPU.

FIG. 2 shows the general layout for integer execution. Four integer execution units 34–40 are arranged in two clusters, cluster 0, cluster 1. Each cluster contains a complete copy of the register file: register file 0 30 and register file 1 32. The physical distance between the clusters requires that one cycle of latency exist between the conclusion of an operation in one cluster and the availability of the destination register in the other cluster. Register result data crosses between the clusters in intercluster register bypass buses 56.

The issue logic 100 schedules instructions to minimize the inter-cluster latency. The instructions are statistically assigned to request either the upper or lower pairs of execution units. This allows the instructions to have an opportunity to issue on the same cluster that produces the dependent register.

Figure 3:
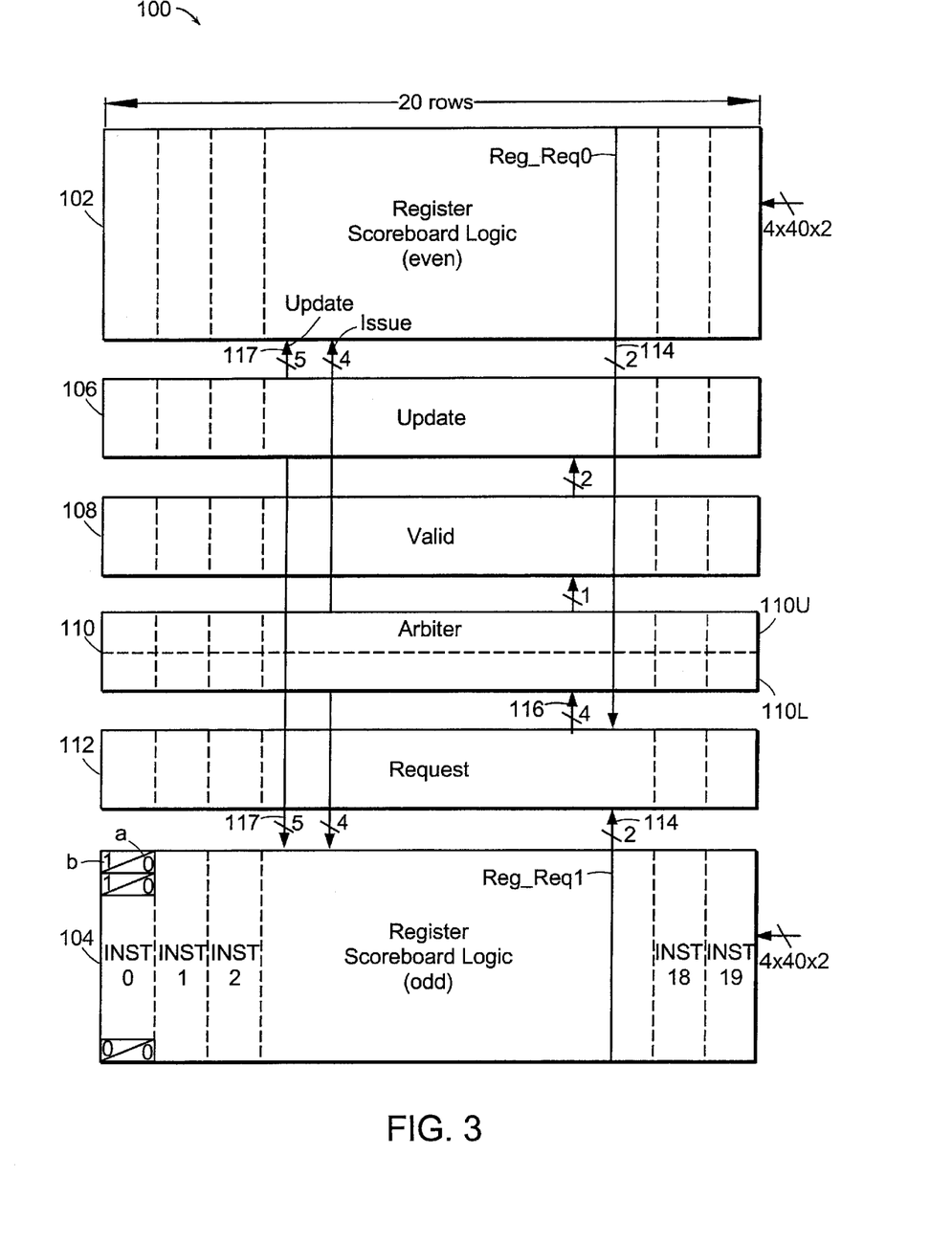
FIG. 3 is a block diagram describing the organization of the issue logic.

FIG. 3 shows the issue logic data path for the instruction queue. It contains 20 rows, one instruction occupying each row. The instructions are ordered from the oldest, INST0, at the bottom to the newest, INST19, in row 19, at the top. Up to four instructions enter the instruction queue per cycle, requiring compaction of the instructions remaining in the queue toward the bottom every cycle.

Register scoreboard logic is divided in halves 102, 104 book-ending the update 106, valid 108, arbiter 110, and request logic 112. Register scoreboard logic 102 holds the 40 even registers and register scoreboard logic 104 holds the odd registers of the 80 total integer, physical registers, in the preferred embodiment.

For every instruction and each potential register required by the instructions, the register scoreboard logic holds two decoded fields (see fields a, b in register score board logic 104 at instruction INST0). The lower field is the decoded source register, and the upper field is the decoded destination register. Each cycle, the source field is compared to outstanding destination register numbers and a match signal is generated on one of two register request wires 114 running across the data path for the instruction in each row.

The request logic 112 stores execution unit assignment information. Each of the execution units 34–40 may execute different instructions or may or may not have access to the data cache 48. The request logic combines the execution assignment information with the two register request signals 114. The output is a four bit field 116 that indicates the execution units requested to the arbiter 110 by each row/instruction.

The inventive arbiter system 110 contains two, a lower and upper, pick-oldest-two arbiter circuits 110U, 110L operating in parallel to choose up to four instructions each cycle for execution, two for the two lower execution units 36, 40 and two for the upper execution units 34, 38. The operation of the arbiter circuits 110U, 110L is coordinated by restricting each instruction in the instruction queue to issue to either the upper execution units 34, 38 or lower 36, 40. Thus, the arbiter circuits will not send the same instruction to issue in two execution units.

The valid logic 108 maintains a valid bit for each instruction and pulls one of the request lines when invalid. It calculates a new valid bit each cycle based on issue, invalidate, and reset information.

Finally, the update logic 106 accepts new valid bits each cycle and generates five select signals 117 used to compact the instructions in the queues 102, 104.

Figure 4:
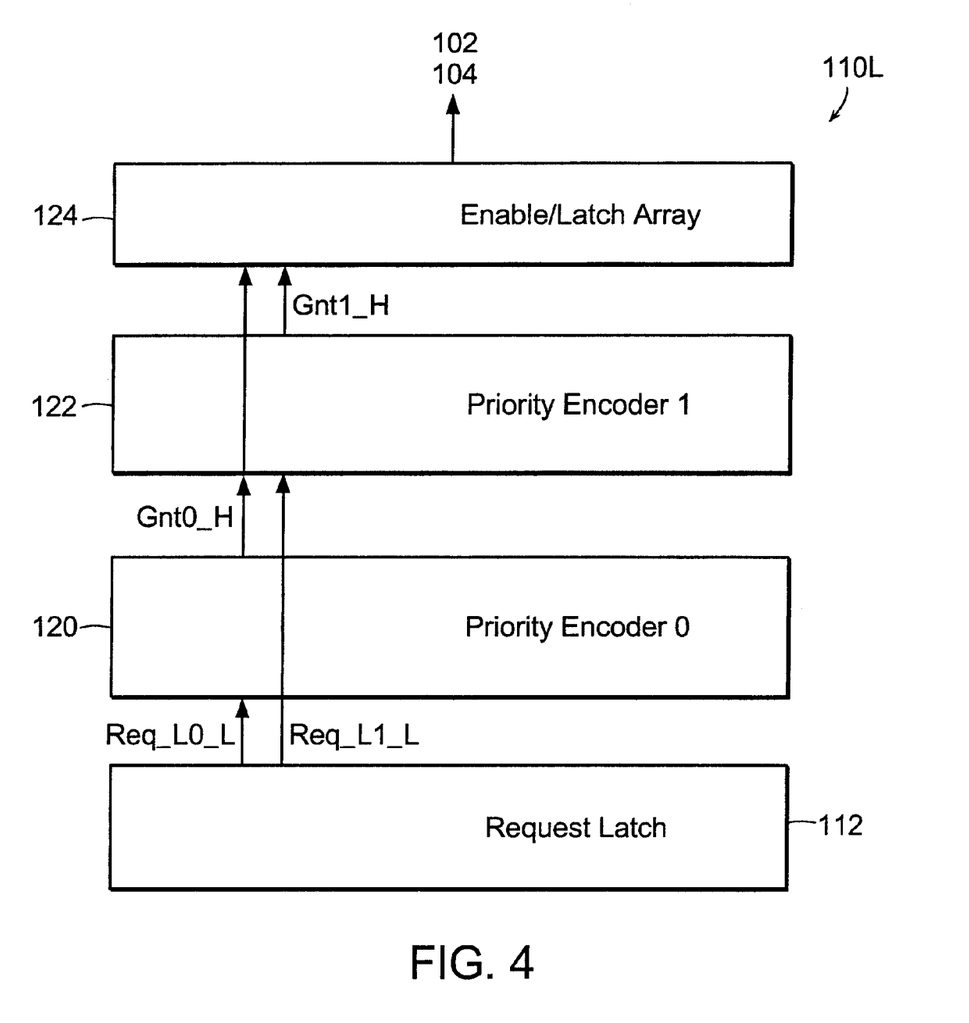
FIG. 4 is a block diagram showing one pick-2 arbiter and its interface with the request logic.

FIG. 4 is a block diagram showing the construction of the pick-2 arbiter circuit 110L, which forms one half of the arbiter system 110 by selecting the instructions issued to the two lower execution units 36, 40. A request latch at the output of the request logic 112 provides two lines Re_L0_L and Re_L1_L, per row/instruction to the pick-2 arbiter circuit 110L for the two lower execution units 36, 40. The request lower execution unit L0 and request lower execution unit L1 signals indicate whether the instruction of the row is requesting the corresponding execution units.

A given instruction may not request a particular execution unit if, for example, that execution unit cannot execute the instruction or if the instruction unit is already busy with an operation that is requiring multiple machine cycles to execute.

The request lower execution unit L0 signal is received by priority encoder 0 120. Similarly, the request lower execution unit L1 signal is received by priority encoder 1 122. Priority encoder 0 is the dominant encoder circuit and priority encoder 1 is the subordinate encoder circuit. Each priority encoder 120,122 has one grant line Gnt0_H Gnt1_H per row. The grant lines Gnt0_H Gnt1_H feed into latch array 124. The grant lines Gnt0_H from priority encoder 0 120 are also passed to priority encoder 1 122 on its way to the latch array 124.

Each priority encoder 120, 122 generates no more than one grant signal among all of its grant lines Gnt0_H, Gnt1 H to indicate the instruction has won the arbitration and will issue to an execution unit on the next machine cycle.

Figure 5:
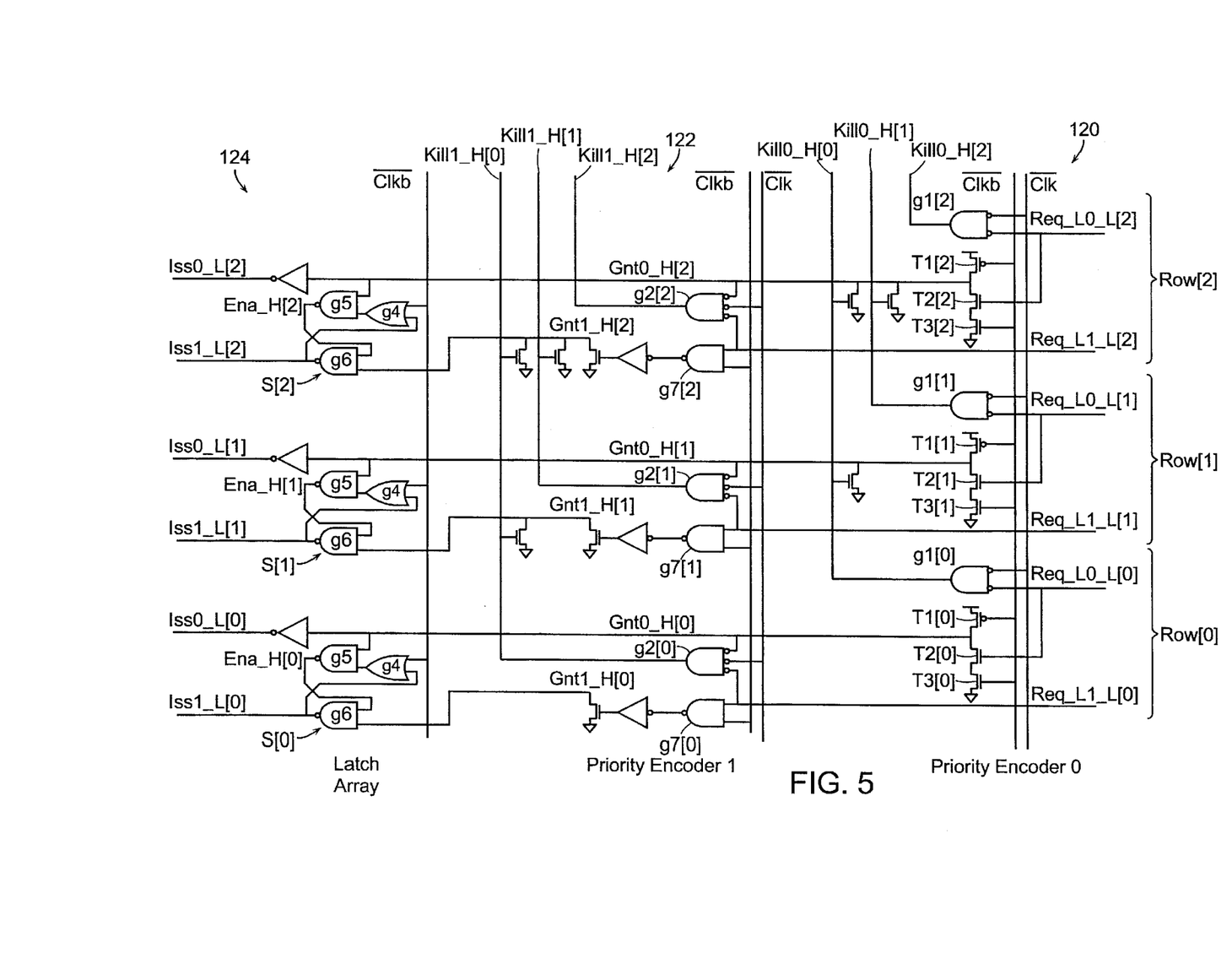
FIG. 5 is a circuit diagram showing the bottom three rows of the pick-2 arbiter circuit according to the present invention.

FIG. 5 illustrates the circuit construction of the priority encoders 0, 1 and the latch array 124, and specifically, their lower three rows. The instructions' request for the lower execution unit L0 are handled by priority encoder 0 120. The Req_L0_L[n] lines are received at a gate G1[n] for each row n. At the beginning of each arbitration cycle, the grant lines Gnt0_H[1–19] are pre-charged via transistors T1[n]. Gates G1[n] generate a kill signal for every higher row on lines Kill0_H[n]. The kill signals, when high, have the effect of de-asserting every grant line Gnt0_H[n] of every higher row. Consequently, the highest priority instruction of the lowest row that requests the lower execution unit L0 36 wins the arbitration and ensures no other instructions can win. In this way, priority encoder 0 120 acts as a greedy picker generating a single grant signal on one of grant lines Gnt0 H[1–19] for the instruction that will be issued to execution unit L 36.

Since each lowest instruction requesting the execution unit L0 36 kills only higher instructions in the queue, transistors T2[n] and T3[n] are used so that an instruction not requesting execution unit L0 de-asserts, self-kills, its corresponding grant line Gnt0_H[n]. This is required for instructions queued below the issuing instruction in the instruction queue.

The operation of priority encoder 1 122 in many ways is very analogous to priority encoder 0 120. The object is to generate only one grant signal to the latch array 124 on lines Gnt1_H[n] for the instruction that will be issued to execution unit L1 40. This operation is accomplished by operating on the execution unit L1 request signals received on request lines Req_L1_L[n].

Distinguishing the operation of priority encoder 1 122 is the fact that the kill signals on lines Kill1_H[n] are generated both by the request signals for the execution unit L1 and the grant signals on lines Gnt0_H[n] from priority encoder 0 120. Specifically, gates G2[n] generate the kill signal on lines Kill1_H[n] for the higher rows, only when a request signal for execution unit L1 40 is received and there is no grant signal, i.e., Gnt0_H[n] has been de-asserted, for the corresponding row. Gates g7[n] perform the grant line self-kill operation in the subordinate encoder 122.

Both grant lines Gnt0_H[n], Gnt1_H[n] for each row are received at the latch array 124. There is a state element S[n] for each row. Each state element S[n] comprises an OR gate G4 receiving the pre-charge clock Clkb and any issue signal on issue line Iss1_L[n] for execution unit L1. The output of OR gate G4 is received at a NAND gate G5, which also receives the grant signals from priority encoder 0 120 for the corresponding row via line Gnt0_H[n]. The output of NAND gate G5 is received at the input of NAND gate G6, which also receives the grant signals from the priority encoder 1 122 on lines Gnt1_H[n]. NAND gate G6 produces the issue signal for execution unit L1 40 on line Iss1_L[n].

Each of the latches or state elements S[n] maintain state while the pre-charge clock Clkb is low.

Clkb=0 with:
Gnt0_H[n]=1
Gnt1_H[n]=1
 if:
  Iss0_L[n]=0−>0
  Iss0_L[n]=1−>1

When the pre-charge clock goes high, the latches S[n] enter an evaluation phase. The following table describes the operation.

| Clkb | Gnt0_H [n] | Gnt1_H [n] | Iss1_L [n] |
|---|---|---|---|
| 1 | 0 | 0 | 1 |
| 1 | 0 | 1 | 0 |
| 1 | 1 | 0 | 1 |
| 1 | 1 | 1 | 1 |

Each of the latches S[n] is set by the falling edge of the de-asserted grant lines Gnt0_H[n]. Only when Gnt0_H[n] is low is Gnt1_H[n] sampled, and when Gnt1_H[n] is high, Gnt1_H[n] is a don't care. As a result, if an instruction loses in the priority encoder 0 120, it enables or sets the output of the latch for the priority encoder 1 122 to generate an issue signal based upon the grant signal from the subordinate encoder 122 based upon whether line Gnt1_H[n] remains asserted.

For example, where row 0 requests in both execution units 36, 40, a grant signal appears on Gnt0_H[n]. When the pre-charged clock Clkb goes high, there is no issue signal for execution unit L1 40, Issue1_L[0] will remain de-asserted.

Figure 6:
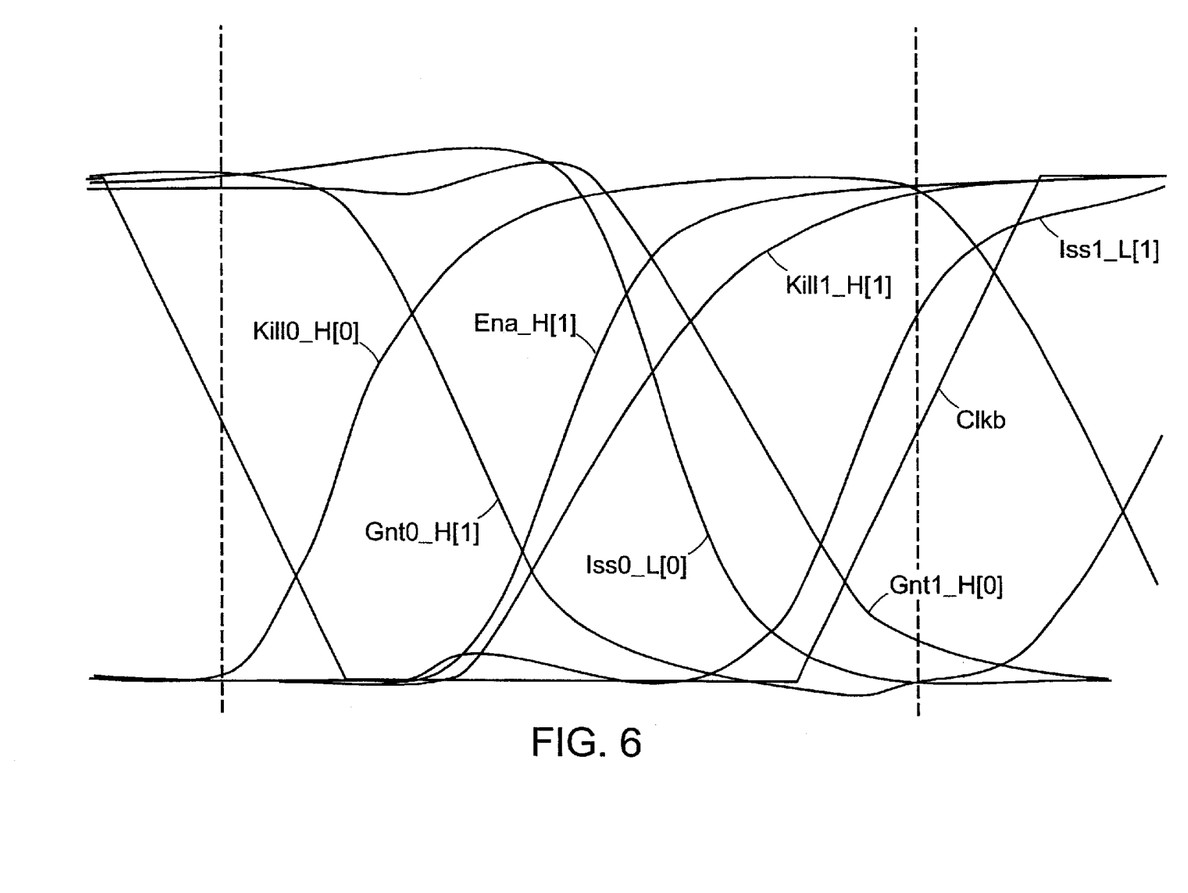
FIG. 6 is a timing diagram illustrating the operation of the inventive arbiter system.

FIG. 6 illustrates the signal timing of the pick-2 arbiter circuit 110L in the situation where all three lower rows request both execution units. Kill lines Kill0_H[0] and Kill1_H[1] discharge all the grant lines of higher rows, i.e., Gnt0_H[1–19] and Gnt1_H[2–19}, respectively. As Gnt0_H[1] falls, Ena_H[1], at the output of gate g5, rises, which in turn asserts its corresponding Issue signal Iss1_L[1]. The deassertion of Gnt1_H[0] results in Iss1_[0] being deasserted., which is the arbiter's critical path. In short, the de-assertion of the grant line Gnt0_H[n] triggers the evaluation of the grant signal from priority encoder 1 on line Gnt1_H[n] in the generation of the issue signal for execution unit L1 on line Iss1_L[0]. In this way, the latching of the issue signals for the instruction array read occurs while preserving the instructions for the issue signals during the pre-charging of the grant lines.

The issue signals are forwarded to an instruction storage array in the register request array and valid logic. The valid logic combines the issue signal with other state to determine which queue row will be removed by the update calculation.

Figure 7:
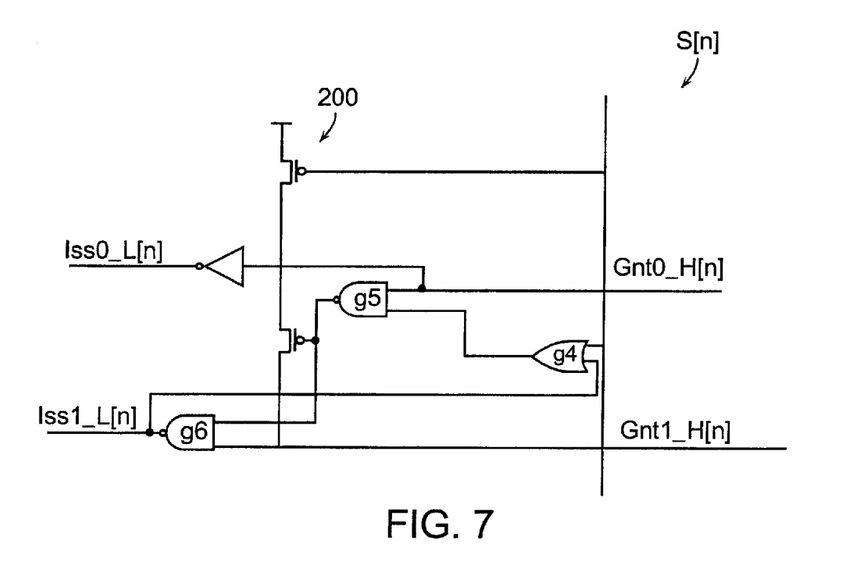
FIG. 7 shows an implementation detail for the latch showing the addition of an interlock circuit.

FIG. 7 shows the addition of an interlock circuit 200 in the latches S[n]. For the latch to maintain its correct operation, Gnt0_H[n] must pre-charge prior to Gnt1_H[n]. This is because to maintain state when an issue signal was previously generated for execution unit L1 40 on line Iss1_L[n], a logic high input must be maintained on one of the two inputs to gate G5. Correct operation is preserved by adding the interlock circuit 200 controlled by the pre-charged clock Clkb. This allows Gnt1_H[n] to pre-charge only after both the output of NAND gate G5 goes low and the pre-charge clock goes high.

Figure 8:
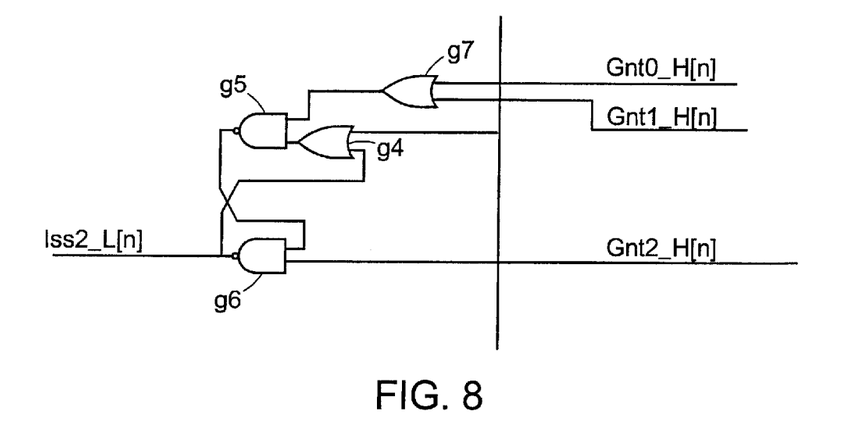
FIG. 8 is a circuit diagram of another embodiment of the latch capable of generating three issue signals.

FIG. 8 is a circuit diagram showing an extension in an alternative embodiment of the present invention. With modification, the dominoed encoder circuits can generate a total of three issue signals. This would be useful in a situation where the machine cycles were longer or the logic faster. Specifically, an additional latch circuit generates a third issue signal on line Iss2_L[n] to a third execution unit only after the de-assertion of both grant lines Gnt0_H[n] and Gnt1_H[n}.

While this invention has been particularly shown and described with references to preferred embodiments thereof, it will be understood by those skilled in the art that various changes in form and details may be made therein without departing from the spirit and scope of the invention as defined by the appended claims. For example, the priority encoders may be used in other circuit applications where the output of one stage should dominate over the other, such as that used in the translation buffers of content addressable memories. Generally, the inventive circuits can be used in any situation where two circuits that generate set and reset signals must be prioritized. Those skilled in the art will recognize or be able to ascertain using no more than routine experimentation, many other equivalents to the specific embodiments of the invention described specifically herein. Such equivalents are intended to be encompassed in the scope of the claims.

What is claimed is:

1. An arbiter system for instruction issue logic, comprising:
   a dominant encoder circuit that selects instructions in an instruction queue for issue to a first execution unit based upon positions of the instructions within the queue and requests by the instructions for the first execution unit; and
   a subordinate encoder circuit that selects instructions in the instruction queue for issue to a second execution unit based upon positions of the instructions within the queue, requests by the instructions for the second execution unit, and an instruction selection of the dominant encoder circuit,
   wherein at least one instruction is capable of requesting plural execution units.

2. An arbiter system as described in claim 1, wherein the dominant encoder circuit and the subordinate encoder circuit select at least two instructions within one machine cycle for issue in the next machine cycle.

3. An arbiter system as described in claim 1, wherein each encoder circuit receives a request signal from each instruction indicating whether the instruction can be issued to the execution unit corresponding to the encoder circuit.

4. An arbiter system as described in claim 1, wherein the dominant encoder circuit generates a first execution unit grant signal for the highest priority queued instruction that requests the first execution unit.

5. An arbiter system as described in claim 4, wherein the subordinate encoder circuit generates a second execution unit grant signal to the highest priority queued instruction that requests the second execution unit and for which the dominant encoder has not generated a grant signal.

6. An arbiter system as described in claim 5, wherein the dominant encoder circuit forms the first execution unit grant signal by pre-charging a first execution unit grant line for each queue row if the instruction of the row requests the first execution unit, and de-asserting the first execution unit grant lines of all queued instructions having a lower priority than the lowest row for which a request signal is asserted.

7. An arbiter system as described in claim 6, wherein the subordinate encoder circuit generates the second execution unit grant signal by pre-charging second execution unit grant lines for each queue row if the instruction of the row requests the second execution unit and de-asserting second execution unit grant lines of all queued instructions having a lower priority than the lowest row for which a request signal is asserted and no first execution unit grant signal is generated by the dominant encoder circuit.

8. An arbiter system as described in claim 7, further comprising an array of state elements, a state element for each row only generating an issue signal to the second execution unit in response to an asserted grant line for the row from the subordinate encoder and a de-asserted grant line from the dominant encoder circuit.

9. An arbiter system as described in claim 8, wherein the state elements are set in response to a de-assertion of the grant line from the dominant encoder to pass any grant signal on the grant line from the subordinate encoder.

10. An arbiter system as described in claim 9, wherein a pre-charge clock latches any grant signal from the subordinate encoder in the state elements.

11. An arbiter system as described in claim 10, further comprising an interlock circuit that prevents a state change of the state elements in response to pre-charging a line conveying the grant signal from the subordinate encoder.

12. An arbiter system as described in claim 1, further comprising a second dominant encoder circuit that selects instructions in an instruction queue for issue to a third execution unit based upon positions of the instructions within the queue and requests by the instructions for the third execution unit; and a second subordinate encoder circuit that selects instructions in the instruction queue for issue to a fourth execution unit based upon positions of the instructions within the queue, requests by the instructions for the fourth execution unit, and an instruction selection of the second dominant encoder circuit.

13. A method for assigning instructions between execution units of a central processing unit, the method comprising:

selecting instructions in an instruction queue for issue to a first execution unit based upon positions of the instructions within the queue and requests by the instructions for the first execution unit; and selecting instructions in the instruction queue for issue to a second execution unit based upon positions of the instructions within the queue, requests by the instructions for the second execution unit, and an instruction selected for the first execution unit, wherein at least one instruction is capable of requesting plural execution units.

14. A method as described in claim 3, further comprising selecting the instructions from the instruction queue for the first and second execution units within one machine cycle for issue in the next machine cycle.

15. A method as described in claim 3, further comprising generating a request signal for each instruction indicating whether the instruction can be issued to each execution unit.

16. A method as described in claim 3, wherein the step of selecting instructions in the instruction queue for issue to the first execution unit comprises generating a first execution unit grant signal for the highest priority queued instruction that requests the first execution unit.

17. A method as described in claim 16, wherein the step of selecting instructions in the instruction queue for issue to the second execution unit comprises generating a second execution unit grant signal to the highest priority queued instruction that requests the second execution unit and for which no first execution unit grant signal was generated.

18. A method as described in claim 17, wherein the step of generating the grant signal for the first execution unit comprises:

pre-charging a grant line for each queue row if the instruction of the row requests the first execution unit; and de-asserting grant lines of all queued instructions having a lower priority than the lowest row for which a request signal is asserted.

19. A method as described in claim 18, wherein the step of generating the grant signal for the second execution unit comprises:

generating the grant signal by pre-charging second execution unit grant lines for each queue row if the instruction of the row requests the second execution unit; and de-asserting second execution unit grant lines of all queued instructions having a lower priority than the lowest row for which a request signal is asserted and no grant signal was generated for the first execution unit.

20. A method as described in claim 19, further comprising generating an issue signal to the second execution unit in response to an asserted grant line for the row for the second execution unit and a de-asserted grant line for the row for the first execution unit.

21. A method as described in claim 20, wherein the step of generating the issue signal to the second execution unit comprises setting state elements in response to a de-assertion of the grant line for the first execution unit to pass any grant signal on the grant line for the second execution unit.

22. A method as described in claim 21, wherein the step of generating the issue signal to the second execution unit further comprises latching, in a latch circuit, any grant signal to the first execution unit for a row in the state elements using a pre-charge clock.

23. A method as described in claim 22, further comprising preventing a state change of the latching circuit in response to pre-charging a line conveying the grant signal.

24. A method as described in claim 3, further comprising selecting instructions in the instruction queue for issue to a third execution unit based upon positions of the instructions within the queue and requests by the instructions for the third execution unit; and selecting instructions in the instruction queue for issue to a fourth execution unit based upon positions of the instructions within the queue, requests by the instructions for the fourth execution unit, and an instruction selection for the third execution unit.

25. An integer instruction issue system, comprising:

an integer instruction queue containing integer instructions that are ordered in the queue based on relative ages of the instructions;

a first integer execution unit for executing integer instructions;

a second integer execution unit for executing integer instructions;

a dominant encoder circuit that selects instructions in the integer instruction queue for issue to the first integer execution unit based upon positions of the instructions within the queue and requests by the instructions for the first execution unit; and a subordinate encoder circuit that selects instructions in the integer instruction queue for issue to the second integer execution unit based upon positions of the instructions within the integer instruction queue, requests by the instructions for the second execution unit, and an instruction selection of the dominant encoder circuit for execution in the first execution unit, wherein at least one instruction is capable of requesting plural integer execution units.

26. The integer instruction issue system of claim 25, wherein the dominant encoder circuit and the subordinate encoder circuit select at least two integer instructions within one machine cycle for issue in the next machine cycle.

27. The integer instruction issue system of claim 25, wherein each encoder circuit receives a request signal from each instruction indicating whether the instruction can be issued to the execution unit corresponding to the encoder circuit.

28. The integer instruction issue system of claim 25, wherein the dominant encoder circuit generates a first execution unit grant signal for the highest priority queued instruction that requests the first execution unit.

29. The integer instruction issue system of claim 28, wherein the subordinate encoder circuit generates a second execution unit grant signal to the highest priority queued instruction that requests the second execution unit and for which the dominant encoder has not generated a grant signal.

30. The integer instruction issue system of claim 29, wherein the dominant encoder circuit forms the first execution unit grant signal by pre-charging a first execution unit grant line for each queue row if the instruction of the row requests the first execution unit, and de-asserting the first execution unit grant lines of all queued instructions having a lower priority than the lowest row for which a request signal is asserted.

31. The integer instruction issue system of claim 30, wherein the subordinate encoder circuit generates the second execution unit grant signal by pre-charging second execution unit grant lines for each queue row if the instruction of the row requests the second execution unit and de-asserting second execution unit grant lines of all queued instructions having a lower priority than the lowest row for which a request signal is asserted and no first execution unit grant signal is generated by the dominant encoder circuit.

32. The integer instruction issue system of claim 31, further comprising an array of state elements, a state element for each row only generating an issue signal to the second execution unit in response to an asserted grant line for the row from the subordinate encoder and a de-asserted grant line for the row from the dominant encoder circuit.

33. The integer instruction issue system of claim 32, wherein the state elements are set in response to a de-assertion of the grant line from the dominant encoder to pass any grant signal on the grant line from the subordinate encoder.

34. The integer instruction issue system of claim 33, wherein a pre-charge clock latches any grant signal from the subordinate encoder in the state elements.

35. The integer instruction issue system of claim 34, further comprising an interlock circuit that prevents a state change of the state elements in response to pre-charging a line conveying the grant signal from the subordinate encoder.

36. The integer instruction issue system of claim 25, further comprising
a second dominant encoder circuit that selects instructions in the integer instruction queue for issue to a third execution unit based upon positions of the instructions within the queue and requests by the instructions for the third integer execution unit; and
a second subordinate encoder circuit that selects instructions in the integer instruction queue for issue to a fourth integer execution unit based upon positions of the instructions within the queue, requests by the instructions for the fourth execution unit, and an instruction selection of the second dominant encoder circuit.

37. A method for assigning integer instructions between integer execution units of a central processing unit, the method comprising:
selecting instructions in an integer instruction queue for issue to a first integer execution unit based upon positions of the instructions within the queue and requests by the instructions for the first execution unit; and
selecting instructions in the integer instruction queue for issue to a second integer execution unit based upon positions of the instructions within the queue, requests by the instructions for the second execution unit, and an instruction selected for the first execution unit,
wherein at least one instruction is capable of requesting plural execution units.

38. The method of claim 37, further comprising selecting the instructions from the instruction queue for the first and second execution units within one machine cycle for issue in the next machine cycle.

39. The method of claim 37, further comprising generating a request signal for each instruction indicating whether the instruction can be issued to each execution unit.

40. The method of claim 37, wherein the step of selecting instructions in the instruction queue for issue to the first execution unit comprises generating a first execution unit grant signal for the highest priority queued instruction that requests the first execution unit.

41. The method of claim 40, wherein the step of selecting instructions in the instruction queue for issue to the second execution unit comprises generating a second execution unit grant signal to the highest priority queued instruction that requests the second execution unit and for which no first execution unit grant signal was generated.

42. The method of claim 41, wherein the step of generating the grant signal for the first execution unit comprises:
pre-charging a grant line for each queue row if the instruction of the row requests the first execution unit; and
de-asserting grant lines of all queued instructions having a lower priority than the lowest row for which a request signal is asserted.

43. The method of claim 42, wherein the step of generating the grant signal for the second execution unit comprises:
generating the grant signal by pre-charging second execution unit grant lines for each queue row if the instruction of the row requests the second execution unit; and
de-asserting second execution unit grant lines of all queued instructions having a lower priority than the lowest row for which a request signal is asserted and no grant signal was generated for the first execution unit.

44. The method of claim 43, further comprising generating an issue signal to the second execution unit in response to an asserted grant line for the row for the second execution unit and a de-asserted grant line for the row for the first execution unit.

45. The method of claim 44, wherein the step of generating the issue signal to the second execution unit comprises setting state elements in response to a de-assertion of the grant line for the first execution unit to pass any grant signal on the grant line for the second execution unit.

46. The method of claim 45, wherein the step of generating the issue signal to the second execution unit further comprises latching, in a latch circuit, any grant signal to the first execution unit for a row in the state elements using a pre-charge clock.

47. The method of claim 46, further comprising preventing a state change of the latching circuit in response to pre-charging a line conveying the grant signal.

48. The method of claim 37, further comprising
selecting instructions in the instruction queue for issue to a third integer execution unit based upon positions of the instructions within the queue and requests by the instructions for the third execution unit; and
selecting instructions in the instruction queue for issue to a fourth integer execution unit based upon positions of the instructions within the queue, requests by the instructions for the fourth execution unit, and an instruction selection for the third execution unit.

* * * * *

UNITED STATES PATENT AND TRADEMARK OFFICE
CERTIFICATE OF CORRECTION

PATENT NO.   : 6,249,855 B1
DATED        : June 19, 2001
INVENTOR(S)  : James A. Farrell and Bruce A. Gieseke It is certified that error appears in the above-identified patent and that said Letters Patent is hereby corrected as shown below:

Column 9, claim 14,
Line 26, delete "claim 3" and insert -- claim 13 --;

Column 9, claim 15,
Line 30, delete "claim 3" and insert -- claim 13 --;

Column 9, claim 16,
Line 33, delete "claim 3" and insert -- claim 13 --;

Column 10, claim 24,
Line 15, delete "claim 3" and insert -- claim 13 --.

Signed and Sealed this

Nineteenth Day of February, 2002

*Attest:*

JAMES E. ROGAN
*Attesting Officer*   *Director of the United States Patent and Trademark Office*